UNITED STATES PATENT OFFICE.

WILLIAM KIEL, OF BUTLER, NEW JERSEY, ASSIGNOR TO KIEL, BUTLER & TURNBULL, OF NEW YORK, N. Y.

VULCANIZED PLASTIC COMPOUND.

SPECIFICATION forming part of Letters Patent No. 412,264, dated October 8, 1889.

Application filed January 19, 1889. Serial No. 296,915. (Specimens.)

*To all whom it may concern:*

Be it known that I, WILLIAM KIEL, a citizen of the United States, residing at Butler, in the county of Morris, in the State of New Jersey, have invented a certain Improvement in Vulcanized Plastic Compounds.

The following is a full, clear, and exact description of my invention.

My invention consists in an improvement in vulcanized plastic compounds, which can be used in the place of hard and soft rubber, bone, ivory, wood, and other similar materials. I obtain this result by using wood as an ingredient in a new vulcanized plastic compound.

I am well aware that attempts have been made to mix fibrous matters with rubber compounds; but in such attempts such fibrous materials have been used solely as adulterants of rubber, and the resulting product is an inferior grade of rubber. So far as I know wood has not been heretofore a constituent part of a vulcanized plastic rubber compound.

My invention consists of an improvement in vulcanized plastic compounds, of which the ingredients are as follows: wood, sulphur, oil or pitch, or other commingling vulcanizable substance, and crude rubber. I preferably combine equal weights of these ingredients, and I use crude rubber which has been washed and dried.

To prepare my new compound I saw or otherwise convert the wood into some small form, and from it I remove all moisture by artificial or other means, and, if necessary, wash out any acids that may be in it. The dry particles of wood, the sulphur, the oil or pitch, or other commingling vulcanizable substance, and the crude rubber are then mixed together.

One of the processes of manufacturing my new compound is as follows: I mix the wood, sulphur, and oil or pitch together and subject this mixture to vulcanization. To the mass thus obtained I add crude rubber by passing the mass and rubber through heated rollers, such as are ordinarily used in the manufacture of rubber. Beeswax may be added in small quantities to the compound before vulcanization. By it the vulcanized product is toughened. The compound prepared by the above method, or such other methods as may be found convenient, is then ready to be put into molds or otherwise treated to produce any desired form and then vulcanized. In the process of vulcanization the pressure, the heat, and the time vary according to the nature of flexibility and hardness of the material to be produced.

The time and pressure applied in the process of vulcanization of hard rubber will, if applied to my new compound, produce a hard material, and in like manner the time and pressure applied in the process of vulcanization in the manufacture of soft rubber will, if applied to my new compound, produce a soft material; but I do not confine myself to the limits within which these respective processes of vulcanization vary.

I have described my new compound as made of wood, sulphur, oil or pitch, and crude rubber united by vulcanization; but it is to be understood that any equivalent of oil or pitch may be used—such as, for example, tallow or even beeswax, or generally any commingling vulcanizable substance—the principal feature of novelty and value in my composition being the use of wood as a constituent part of a vulcanizable compound, giving thereto new and valuable properties. The oil acts as a commingling vulcanizable agent, and at the same time tends to toughen the finished vulcanized product.

My new compound when vulcanized in a hard form is in its texture and general qualities similar to horn and whalebone. As wood is free from the grit which is always found in crude rubber gum, my new compound in its hard form has much less grit in it than hard rubber or any of its compounds hitherto known. Furthermore, it is much more bulky, for equal weights, and is also much cheaper than hard rubber.

In its soft form my new compound when vulcanized is lighter in weight than soft rubber and its compounds as now made, and it is, for equal weights, more bulky and at the same time cheaper than soft rubber.

I do not confine myself to the exact proportions herein indicated, and I do not confine myself to any particular process of converting the particles of wood into a convenient shape for the use herein described, and I do not confine myself to wood reduced to any particular form.

I do not claim in this application any of the particular processes of preparing my new compound herein described, as such processes are the subject of applications by me for Letters Patent filed simultaneously herewith.

What I claim, and desire to secure by Letters Patent, is—

1. A vulcanized plastic compound consisting of wood, sulphur, a commingling vulcanizable substance, and crude rubber united by vulcanization, substantially as described.

2. A vulcanized plastic compound consisting of wood, sulphur, oil, and crude rubber united by vulcanization, substantially as described.

WILLIAM KIEL.

Witnesses:
SHERMAN EVARTS,
THOMAS HUNT.